United States Patent [19]

Kimura

[11] Patent Number: 5,218,504

[45] Date of Patent: Jun. 8, 1993

[54] DISC-DRIVE APPARATUS HAVING FUNCTION OF PREVENTING DESTRUCTION OF DATA

[75] Inventor: Toshiki Kimura, Yokohama, Japan

[73] Assignee: Fujitsu Limited, Kawasaki, Japan

[21] Appl. No.: 717,012

[22] Filed: Jun. 18, 1991

[30] Foreign Application Priority Data

Jun. 22, 1990 [JP] Japan .................................. 2-165172

[51] Int. Cl.⁵ .............................................. G11B 5/02
[52] U.S. Cl. ...................................... 360/137; 360/68; 360/69
[58] Field of Search ...................... 360/61, 68, 69, 137

[56] References Cited

U.S. PATENT DOCUMENTS 4,636,905  1/1987  Morimoto et al. .
4,689,698  8/1987  Ishikawa et al. .

FOREIGN PATENT DOCUMENTS 59-124064   7/1984  Japan .
59-154615   9/1984  Japan .
59-154671   9/1984  Japan .
60-157629   8/1985  Japan .
61-269209  11/1986  Japan .
63-010304   1/1988  Japan .

Primary Examiner—Paul Gensler
Attorney, Agent, or Firm—Welsh & Katz, Ltd.

[57] ABSTRACT

A disc-drive apparatus includes a writing unit responsive to a head select signal fed from a host controller, for selecting one of a plurality of heads to write write data into a medium, a power supply voltage generating unit for generating at least one power supply voltage, a unit for monitoring the power supply voltage fed to the writing unit and, upon detecting an abnormality of the monitored power supply voltage, outputting a reset signal, and a latching unit for retaining the head select signal to be fed to the writing unit. Upon receipt of the reset signal, the latching unit prohibits a latching and switching operation to be carried out by a subsequent head select signal fed from the host controller and maintains an output state of the retained head select signal, while the power supply voltage generating unit stops a supply of the power supply voltage to the writing unit. As a result, it is possible to prevent data in the medium from being destroyed due to a change or re-writing thereof by a malfunction of head selection operation occurring during a transient state of a lowering of the power supply voltage, or the like.

8 Claims, 4 Drawing Sheets

DISC-DRIVE APPARATUS HAVING FUNCTION OF PREVENTING DESTRUCTION OF DATA

BACKGROUND OF THE INVENTION

1. Field of the Invention

The present invention relates to a technique of preventing a destruction of data in a magnetic disc storage. More particularly, it relates to an improvement of a disc-drive apparatus which monitors an abnormality of a power supply voltage fed to a data writing unit magnetically coupled to a magnetic medium and, upon detecting the abnormality, forcibly cuts off the power supply voltage to thereby prevent a destruction of the data.

2. Description of the Related Art

In a known typical magnetic disc storage, a data writing unit for head selection and data writing, e.g., in the form of an integrated circuit (IC), receives a head select signal from a host controller in the write operation and selects one from among a plurality of magnetic heads. At the same time, the data writing unit receives a write gate signal from the host controller and drives a write amplifier provided therein at a constant current to cause a write current corresponding to the write data to flow through the selected magnetic head. In the write operation, where an abnormality occurs in that, e.g., a power supply voltage fed to the data writing unit is lowered, it is very difficult or almost impossible to ensure a reliable write operation.

To cope with this disadvantage, a prior art disc-drive apparatus monitors a power supply voltage fed thereto and, upon detecting an abnormality of the monitored power supply voltage, outputs a reset signal to a power supply voltage clamping circuit to thus clamp the power supply voltage, and forcibly cuts off the power supply voltage fed to a write amplifier provided therein, to thereby prevent a malfunction thereof. In this case, the disc-drive apparatus feeds the reset signal to a host controller and thus causes the write gate signal to be made OFF.

Nevertheless, a problem arises in a transient state existing until the functioning of the write amplifier is completely stopped based on the clamping of the power supply voltage. Namely, when a signal level of the head select signal fluctuates with a lowering of the power supply voltage in the transient state, the disc-drive apparatus is brought to a state equivalent to a state wherein the head select signal is changed or switched, because the functioning of the write amplifier per se has not completely stopped. Accordingly, in the transient period existing until the host controller receives the reset signal and responds thereto, to cause the write gate signal to be made OFF, a possibility occurs in that data of a medium corresponding to a head switched due to the malfunction is destroyed.

In view of this, there is a demand for an improvement of the conventional disc-drive apparatus to provide it with a function of completely preventing any destruction of data during the clamping of the power supply voltage.

Note, problems in the prior art will be explained in detail later in contrast with the preferred embodiments of the present invention.

SUMMARY OF THE INVENTION

An object of the present invention is to provide a disc-drive apparatus which can reliably prevent a destruction of data in a medium due to a change or rewriting thereof by a malfunction of a head selection operation occurring during a transient state of a lowering of a power supply voltage applied thereto, or the like.

According to the present invention, there is provided an apparatus for driving a disc storage including: a writing unit, responsive to a head select signal and a write gate signal fed from a host controller, for selecting one of a plurality of heads and writing write data via the selected head into a medium; a power supply voltage generating unit, operatively connected to the writing unit, for generating power supply voltages used in the apparatus; a power supply voltage monitoring unit for monitoring a power supply voltage fed to the writing unit from the power supply voltage generating unit and, upon detecting an abnormality of the monitored power supply voltage, outputting a reset signal indicating the abnormality; and a latching unit, operatively connected to the writing unit and the power supply voltage monitoring unit, for retaining the head select signal to be fed to the writing unit from the host controller and, upon receiving the reset signal, prohibiting a latching and switching operation to be carried out by a subsequent head select signal fed from the host controller and maintaining an output state of the retained head select signal, the power supply voltage generating unit being responsive to the reset signal and stopping a supply of the power supply voltage to the writing unit.

BRIEF DESCRIPTION OF THE DRAWINGS

Other objects and features of the invention will be described hereinafter in detail by way of preferred embodiments with reference to the accompanying drawings, in which.

DESCRIPTION OF THE PREFERRED EMBODIMENTS

For a better understanding of the preferred embodiments of the present invention, the problems in the prior art will be explained with reference to FIG. 1.

Figure 1:
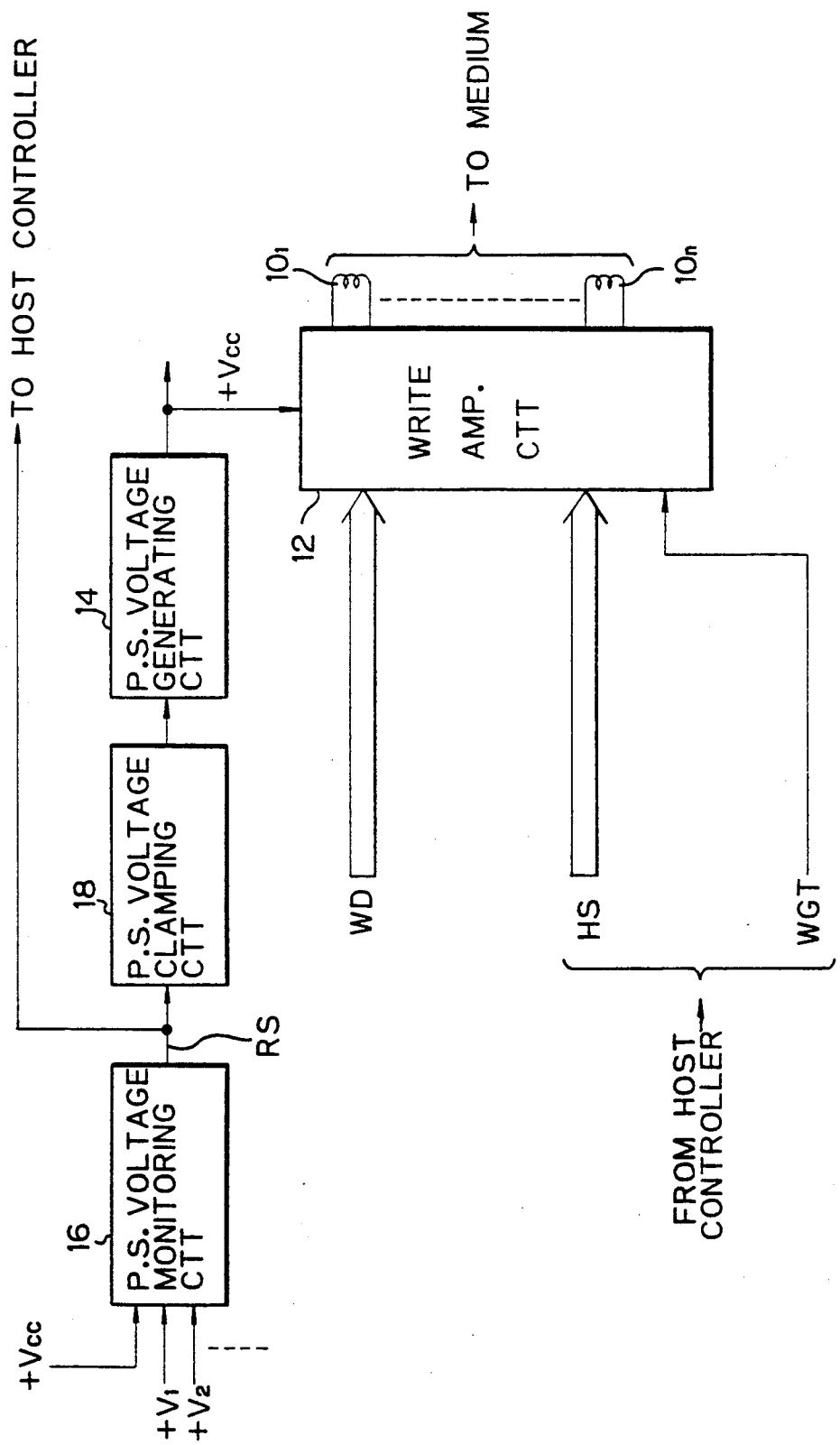
FIG. 1 is a block diagram illustrating a constitution of part of a prior art disc-drive apparatus.

FIG. 1 illustrates a constitution of part of a prior art disc-drive apparatus, i.e., a constitution for preventing a destruction of data in a magnetic disc storage.

In FIG. 1, reference 12 denotes a write amplifying circuit embodied as a data writing unit in the form of an IC (head IC), which is provided with a plurality of write amplifiers (not shown) each provided for each of a plurality of magnetic heads $10_1 \sim 10n$. The write amplifying circuit 12 is supplied with a head select signal HS from a host controller and, based on the head select signal HS, selects one of the plurality of heads $10_1 \sim 10n$ to enable the write operation. Also, the write amplifying circuit 12 is supplied with a write gate signal WGT from the host controller and, in response to the write gate signal WGT, drives a write amplifier (not shown) at a constant current to cause a write current corresponding to a write data WD to flow through the selected magnetic head. Thus, the write data WD is written via the selected head into a medium.

Furthermore, the write amplifying circuit 12 is supplied with a power supply voltage +Vcc from a power supply voltage generating circuit 14 for an exclusive use of the head IC (12). All of the power supply voltages +$V_1$, +$V_2$, ..., fed to the apparatus, including the above power supply voltage +Vcc, are monitored by a power supply voltage monitoring circuit 16. For example, when the power supply voltage +Vcc falls below a predetermined threshold voltage at which a reliable write operation cannot be assured, the monitoring circuit 16 detects an abnormality of the monitored voltage +Vcc and outputs a reset signal RS. The reset signal RS is fed to a power supply voltage clamping circuit 18 and the host controller. The clamping circuit 18 responds to the reset signal RS and controls the power supply voltage generating circuit 14 to clamp the power supply voltage +Vcc. By the clamping operation, the circuit 14 stops the supply of the voltage +Vcc and causes the write amplifying circuit 12 to stop the write operation. Furthermore, the host controller responds to the reset signal RS and brings the write gate signal WGT to the OFF state, from the existing ON state. The write amplifying circuit 12 in turn responds to the write gate signal WGT of OFF state and prevents a write current corresponding to the write data WD from flowing through the selected head.

Thus, by a combination of the clamping operation based on the detection of the abnormality of the power supply voltage and the operation bringing the write gate signal to the OFF state, it is possible to prohibit the write operation upon the occurrence of the above abnormality and thus prevent data of the medium from being destroyed.

In the prior art disc-drive apparatus, however, a problem occurs in that data in the medium is changed or re-written, i.e., destroyed, due to a malfunction of the head selection operation during a certain transient period. This period is that from the start of the clamping of the power supply voltage based on the detection of the abnormality thereof to the time at which the write gate signal is made completely OFF by the host controller.

Namely, when a state of the level of the head select signal fluctuates with a lowering of the power supply voltage during the above transient period, the apparatus is brought to a state equivalent to that wherein the head select signal is changed or switched, because the functioning of the write amplifying circuit 12 per se has not been completely stopped and the host controller has not finished bringing the write gate signal to the OFF state. Accordingly, in the transient period until the write gate signal is completely brought to the OFF state, a possibility occurs in that data in the medium corresponding to a head switched due to the malfunction is changed and thus destroyed.

Figure 2:
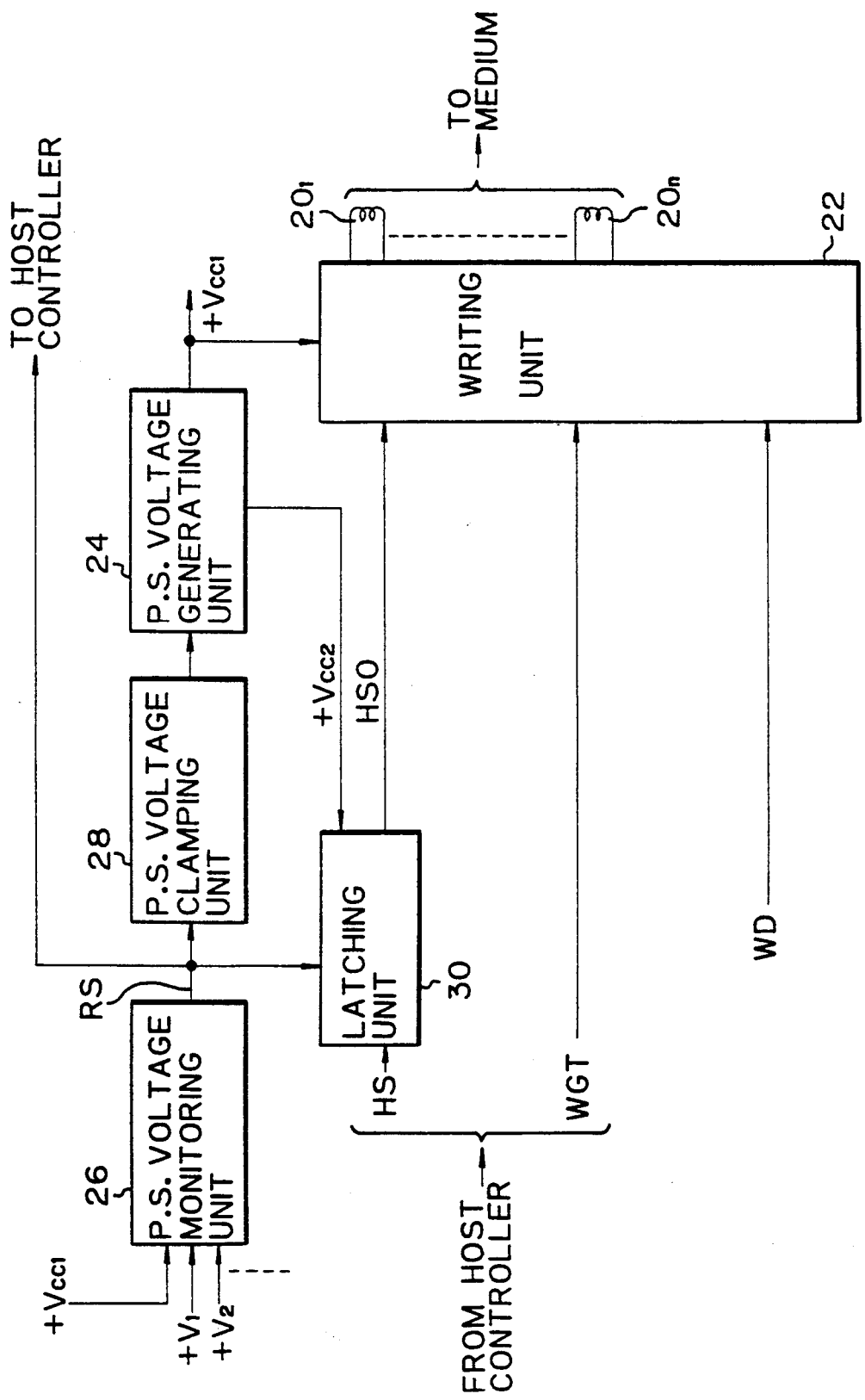
FIG. 2 is a block diagram illustrating a fundamental constitution of the disc-drive apparatus according to the present invention.

FIG. 2 illustrates a fundamental constitution of the disc-drive apparatus according to the present invention.

In the illustration, reference 22 denotes a writing unit, which receives a head select signal HSO (HS) and a write gate signal WGT and responds thereto to select one of a plurality of heads $20_1 \sim 20n$ and write a write data WD via the selected head into a medium. The signals HS and WGT are fed from a host controller (not shown) provided in the magnetic disc storage incorporating the present apparatus. Reference 24 denotes a power supply voltage generating unit, which is operatively connected to the writing unit and generates various power supply voltages used in the apparatus. Reference 26 denotes a power supply voltage monitoring unit, which monitors a power supply voltage +$Vcc_1$ fed to the writing unit 22 from the power supply voltage generating unit 24 and, upon detecting an abnormality of the monitored voltage, outputs a reset signal RS indicating the abnormality. Also, reference 28 denotes a power supply voltage clamping unit, which is operatively connected to the power supply voltage generating unit 24 and the power supply voltage monitoring unit 26. The clamping unit 28 receives the reset signal RS and responds thereto to cause the power supply voltage generating unit 24 to stop the supply of the power supply voltage +$Vcc_1$ to the writing unit 22.

Reference 30 denotes a latching unit, which characterizes the disc-drive apparatus of the present invention. The latching unit 30 is operatively connected to the writing unit 22 and the power supply voltage monitoring unit 26, retains the head select signal HSO to be fed to the writing unit 22 from the host controller and, upon receiving the reset signal RS, prohibits a latching and switching operation to be carried out by a subsequent head select signal fed from the host controller and maintains an output state of the retained head select signal HSO.

In the constitution explained above, when the monitoring unit 26 detects an abnormality of the monitored power supply voltage, and accordingly, outputs the reset signal RS, the clamping unit 28 responds to the reset signal RS to start its clamping operation and, at the same time, the latching unit 30 responds to the reset signal RS to prohibit the present latching state from being switched by a subsequent head select signal fed from the host controller and maintain the output state of the retained head select signal HSO, i.e., the present latching state.

Therefore, even if the apparatus is in a transient state wherein the power supply voltage is being lowered by the clamping operation, it is possible to maintain the output state of the retained head select signal until the write gate signal is completely brought to the OFF state by the host controller. Thus, it is possible to reliably prevent data in the medium from being destroyed due to a change or re-writing thereof by a malfunction of a head selection operation occurring during the transient state from the start of the clamping operation to the time at which the write gate signal is made completely OFF.

Figure 3:
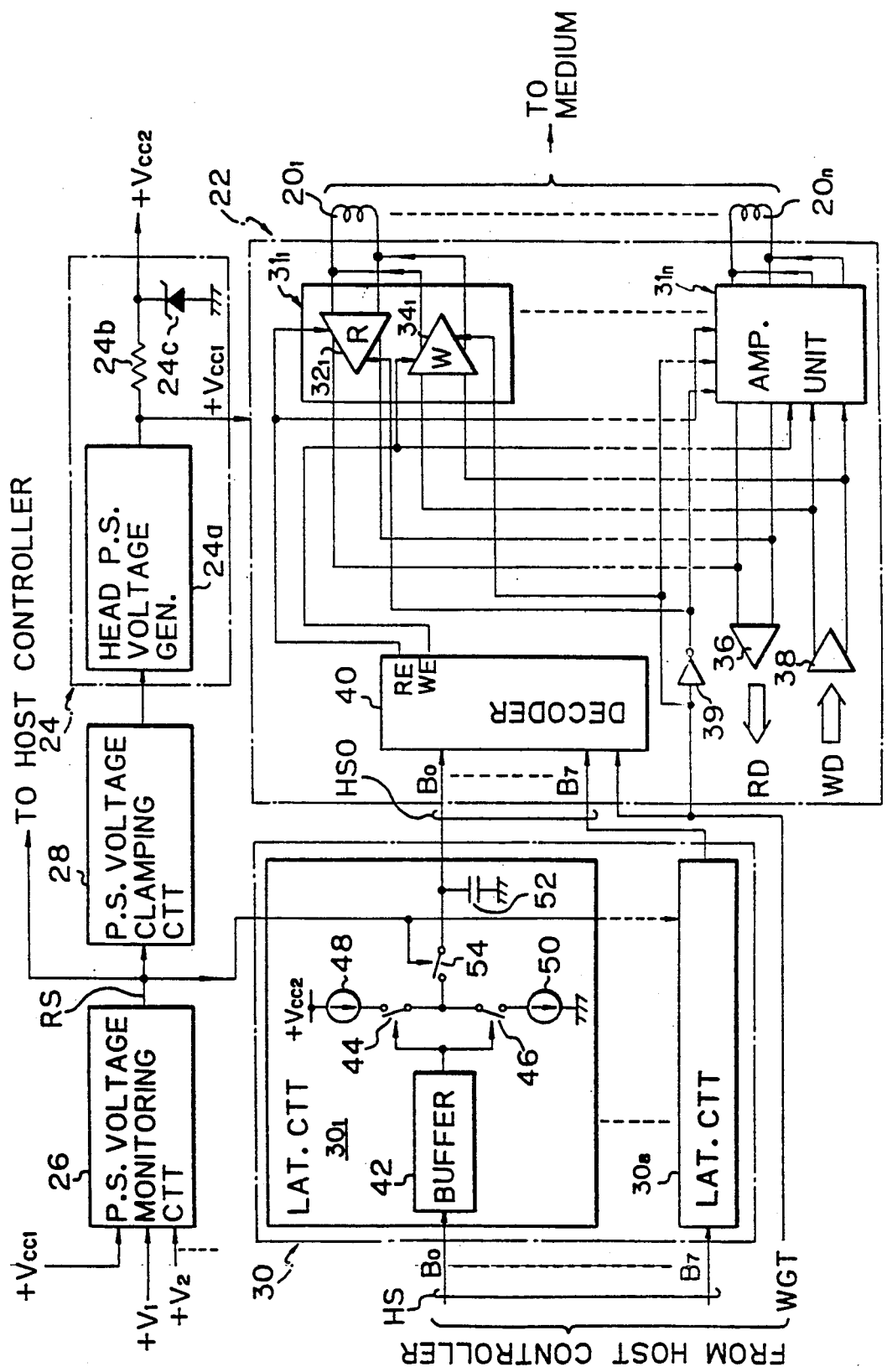
FIG. 3 is a circuit diagram illustrating a constitution of the disc-drive apparatus as an embodiment of the present invention.

FIG. 3 illustrates a circuit constitution of the disc-drive apparatus as an embodiment of the present invention.

In FIG. 3, reference 22 denotes a head circuit unit embodied as a head IC (corresponding to the writing unit 22 of FIG. 2) provided with a plurality of magnetic heads $20_1 \sim 20n$ coupled to the outside thereof, and a plurality of amplifier units $31_1 \sim 31n$ provided therein each provided for each of the plurality of heads $20_1 \sim 20n$. Each of the amplifier units $31_1 \sim 31n$ includes a read amplifier $32_1$ and a write amplifier $34_1$ connected in parallel with each other and provided for the respective heads $20_1 \sim 20n$. The output signal of each read amplifier $32_1$ of the amplifier units $31_1 \sim 31n$ is output via an output buffer 36 to a read regenerative circuit (not shown). Also, a write data WD subject to a predetermined modulation is fed via an input buffer 38 to each write amplifier $34_1$ of the amplifier units $31_1 \sim 31n$.

Reference 40 denotes a decoder, which effects a switching of the read/write operation and selects one of the heads $20_1 \sim 20n$ in the read operation or the write operation. Namely, the decoder 40 feeds a read enable signal RE to the respective read amplifier $32_1$ of the amplifier units $31_1 \sim 31n$ and, based on the decoding, makes effective only the read enable signal RE corresponding to a selected read amplifier, to thus carry out the read operation and the head selection for the read operation. In the same manner, the decoder 40 feeds a write enable signal WE to the respective write amplifier $34_1$ of the amplifier units $31_1 \sim 31n$ and, based on the decoding, makes effective only the write enable signal WE corresponding to a selected write amplifier, to thus carry out the write operation and the head selection for the write operation.

The head circuit unit 22 is supplied with a power supply voltage $+Vcc_1$ from a head power supply voltage generating circuit $24a$, for the exclusive use thereof, provided within the power supply voltage generating circuit 24. All of the power supply voltages $+V_1$, $+V_2$, ..., fed to the apparatus, including the power supply voltage $+Vcc_1$, are monitored by a power supply voltage monitoring circuit 26. For example, when the power supply voltage $+Vcc_1$ falls below a predetermined threshold voltage at which a reliable write operation cannot be assured, the monitoring circuit 26 detects an abnormality of the monitored voltage $+Vcc_1$ to output a reset signal RS. The reset signal RS is fed to a power supply voltage clamping circuit 28 and a host controller (not shown). The clamping circuit 28 responds to the reset signal RS and controls the power supply voltage generating circuit 24 to clamp the power supply voltage $+Vcc_1$. By the clamping operation, the circuit 24 stops the supply of the voltage $+Vcc_1$ and causes the head circuit unit 22 to stop the write operation.

The decoder 40 provided in the head circuit unit 22 is supplied with a write gate signal WGT from the host controller and receives a head select signal HS of eight bits $B_0 \sim B_7$ for selecting one of the magnetic heads $20_1 \sim 20n$, which is fed via the latching circuit unit 30. The head select signal HS passes through the latching circuit unit 30 and thus is fed to the decoder 40 as a head select output signal HSO. Note, the write gate signal WGT is fed directly to the respective write amplifier $34_1 \sim 34n$ of the amplifier units $31_1 \sim 31n$ and fed via an inverter 39 to the respective read amplifier $32_1 \sim 32n$ thereof.

The latching circuit unit 30 includes a plurality of latching circuits $30_1 \sim 30_8$ each provided for the respective bit $B_0 \sim B_7$ of the head select signal HS.

Each of the latching circuits $30_1 \sim 30_8$ has the same constitution and thus the constitution and operation thereof will be explained with reference to the latching circuit $30_1$ as an example.

The bit $B_0$ of the head select signal HS fed from the host controller is stored in a buffer 42 and the corresponding bit $B_0$ of the head select output signal HSO to be output to the decoder 40 is controlled according to the logic of the stored bit $B_0$. Following the buffer 42 is provided a circuit constituted by a constant current source 48, electronic switches 44, 46, and a constant current source 50, connected in series between a power supply line $+Vcc_2$ and a ground line. The switches 44 and 46 are switched such that one is turned ON and the other is turned OFF, according to the logic of the head select signal bit $B_0$ stored in the buffer 42. In the present example, when the bit $B_0$ is at "H" ("L") level, the switch 44 (46) is turned ON and the switch 46 (44) is turned OFF. The connection point between the switches 44 and 46 is connected via an electronic switch 54 and a bit ($B_0$) output line to the decoder 40, and a capacitor 52 is connected between the bit output line and the ground line.

When the switch 44 is ON and the switch 46 is OFF, the capacitor 52 is charged by the constant current of the source 48 and thus brings a potential of the bit ($B_0$) output line to "H" level. On the other hand, when the switch 44 is OFF and the switch 46 is ON, electric charges in the capacitor 52 are discharged by the constant current of the source 50 and thus the potential of the bit ($B_0$) output line is lowered to "L" level.

The switch 54 provided at the input side of the capacitor 52 is a normally-closed type switching element which can be constituted by transistors of one or two stages, and controlled by the reset signal RS from the power supply voltage monitoring circuit 26. In the present example, when the power supply voltage $+Vcc_1$ is within the normal range, the reset signal RS is at "L" level and thus the switch 54 remains closed (i.e., ON state). In this case, the content of the head select signal bit $B_0$ retained in the buffer 42 is stored in the capacitor 52 by the ON/OFF operation of the switches 44, 46 and, thus, the corresponding head select output signal bit $B_0$ is made effective in accordance with the charging or discharging state of the capacitor 52. Conversely, when the power supply voltage $+Vcc_1$ is out of the normal range, the reset signal RS is made "H" level by the monitoring circuit 26 and thus the switch 54 is made open (i.e., OFF state). In this case, the influence by the ON/OFF operation of the switches 44, 46 is not exerted on the bit ($B_0$) output line. Namely, when the switch 54 is turned OFF, the capacitor 52 is prohibited from being charged or discharged. Accordingly, the capacitor 52 is maintained in the charged or discharged state existing when disconnected by the switch 54.

The latching circuit unit 30 is supplied with a power supply voltage $+Vcc_2$ from the power supply voltage generating circuit 24. The power supply voltage $+Vcc_2$ is lower than the power supply voltage $Vcc_1$ fed to the head circuit unit 22, and is produced from the power supply voltage $Vcc_1$ by a resistor $24b$ and a Zener diode $24c$ provided in the circuit 24. Note, the power supply voltage $+Vcc_2$ must be such that it enables a stable operation of each latching circuit $30_1 \sim 30_8$. In this case, when the power supply voltage $+Vcc_2$ is normally fed to the corresponding latching circuit $30i$ and the reset signal RS is at "L" level, the normally-closed type switch 54 remains ON. On the other hand, when the power supply voltage $+Vcc_1$ is cut off and the reset signal RS is at "H" level, the switch 54 is made open to be OFF state.

Figure 4:
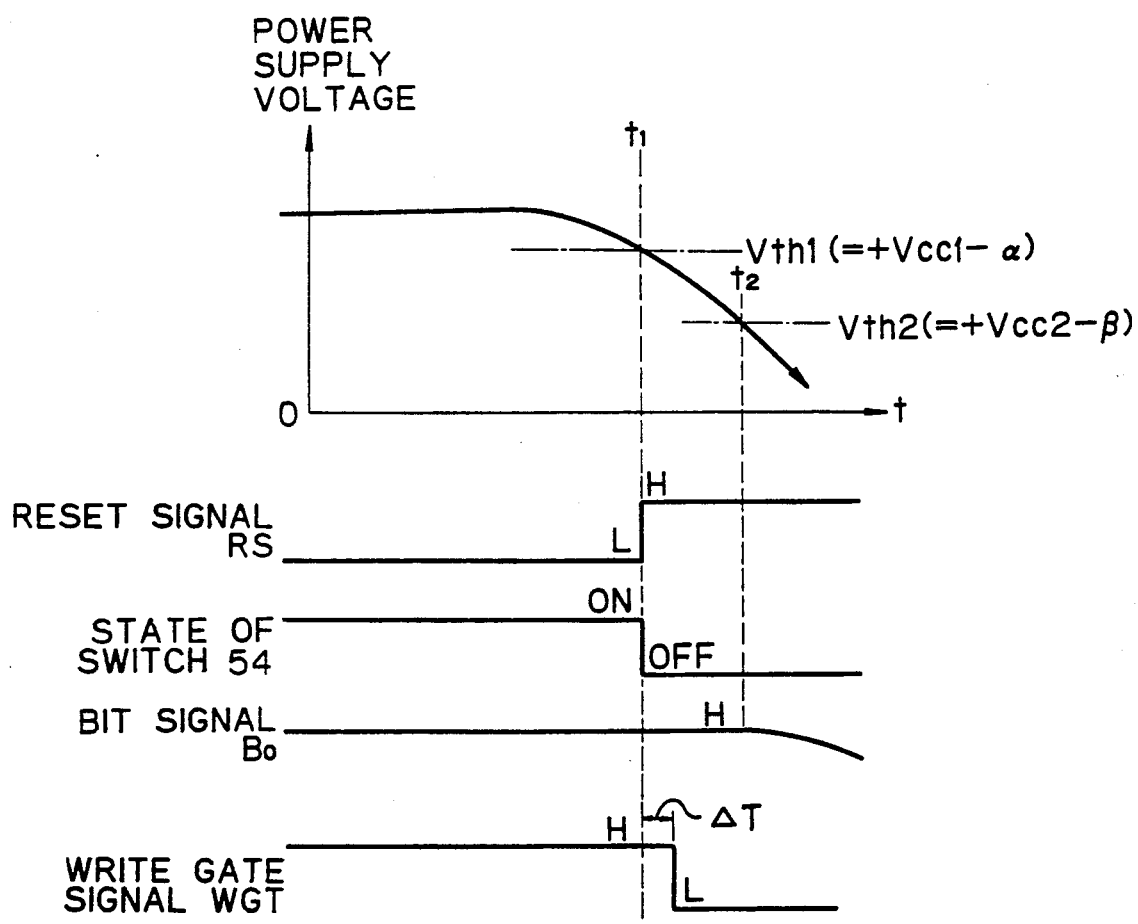
FIG. 4 is a timing chart for explaining the operation of the apparatus shown in FIG. 3.

Next, the operation of the apparatus of FIG. 3 will be explained with reference to the timing chart shown in FIG. 4.

It is assumed that, from the host controller, the head select signal HS for selecting the magnetic head $20_1$ is fed to the latching circuit unit 30 and the write gate signal WGT is fed to the head circuit unit 22. Also, where the power supply voltage $+Vcc_1$ is normally fed to the head circuit unit 22, the reset signal RS is at "L" level and thus the switch 54 is in the ON state.

The respective bit $B_0 \sim B_7$ of the head select signal HS is stored in the buffer 42 of the corresponding latching circuit $30_1 \sim 30_8$. As previously explained, when the corresponding bit Bi is at "H" ("L") level, the switch 44 (46) is turned ON and the switch 46 (44) is turned OFF. In this case, since the switch 54 is in the ON state, the capacitor 52 is charged (or discharged) by the constant current source 48 (or the constant current source 50) while the switch 44 (or the switch 46) is in the ON state. Thus, each bit $B_0 \sim B_7$ of the head select output signal HSO corresponding to the respective bit $B_0 \sim B_7$ of the head select signal HS is made "H" level or "L" level, in accordance with the charging or discharging state of the capacitor 52.

The decoder 40 in turn responds to the head select output signal HSO and the write gate signal WGT of "H" level, makes effective the write enable signal WE corresponding to, e.g., the write amplifier $34_1$, and prepares a head selection state enabling the write operation by the magnetic head $20_1$. In this state, data is written into the medium based on the supply of a write current according to the write data WD fed via the input buffer 38.

In the above write operation, when the power supply voltage $Vcc_1$ fed to the head circuit unit 22 is lowered and, at a time $t_1$, falls below a threshold voltage $Vth_1$ set in the monitoring circuit 26, the reset signal RS is made "H" level. Note, the threshold voltage $Vth_1$ is selected to be a value subtracted from the power supply voltage $Vcc_1$ by a predetermined margin $\alpha$; this value being approximately 4.6 to 4.75V.

The reset signal RS output from the monitoring circuit 26 is sent to the host controller and simultaneously fed to the power supply voltage clamping circuit 28 and the latching circuit unit 30. The clamping circuit 28 responds to the reset signal RS and starts the clamping operation to cut off the supply of the power supply voltage $Vcc_1$ by the power supply voltage generating circuit 24. The power supply voltage $Vcc_1$ is rapidly lowered toward zero volt according to the clamping time constant based on the clamping operation from the time $t_1$ of the detection of abnormality thereof.

On the other hand, each latching circuit $30_1 \sim 30_8$ provided in the latching circuit unit 30 responds to the reset signal RS of "H" level and makes the respective switch 54 open to be OFF state. As a result, the respective capacitor 52 is prohibited from being charged or discharged based on the ON/OFF operation of the switches 44 and 46. Therefore, even if the bit stored in the corresponding buffer 42 is changed in level by the lowering of the power supply voltage accompanied by the clamping operation and thus the head circuit unit 22 is changed to a head selection state different from the present head selection state, it is possible to maintain the output state of the head select output signal HSO for the decoder 40 even during the clamping operation.

Also, the power supply voltage $+Vcc_2$ fed to the latching circuit unit 30 is produced based on the power supply voltage $+Vcc_1$ from the head power supply voltage generating circuit 24a, the output voltage of which is lowered by the clamping operation of the clamping circuit 28. Accordingly, when the power supply voltage $Vcc_1$ is lowered below a threshold voltage $Vth_2$ at a time $t_2$ of FIG. 4, the function of the latching circuit unit 30 per se is lost. Note, the threshold voltage $Vth_2$ is selected to be a value subtracted from the power supply voltage $Vcc_2$ by a voltage margin $\beta$ sufficient for the operation of the latching circuit unit 30. In this case, when the capacitor 52 is charged to "H" level, the potential thereof is gradually lowered due to the discharging thereof after the cut-off of the power supply voltage.

Even if the power supply voltage is cut off and thus the function of the latching circuit unit 30 is lost, however, the switch 54 maintains its OFF state even after the cut-off of the power supply voltage and, accordingly, the discharging time constant of the capacitor 52 is kept to its minimum limit. This is because the normally-closed type switching element is employed as the switch 54. After the power supply voltage falls below the threshold voltage $Vth_2$, the corresponding head select output signal bit $B_0$, which has been at "H" level, is gradually lowered to "L" level.

On the other hand, the host controller receives the reset signal RS of "H" level in the clamping operation, responds thereto to bring the write gate signal WGT to the OFF state ("L" level) after a predetermined time delay $\Delta T$, and thus causes the head circuit unit 22 to stop the supply of the write current to the corresponding magnetic head $20_1 \sim 20n$.

Therefore, since the latching circuit unit 30 maintains the output state of the head select output signal HSO for the decoder 40 from the time $t_1$ of the detection of abnormality of the power supply voltage until the write gate signal WGT is completely made OFF, it is possible to reliably prevent data in the medium from being destroyed due to a change or re-writing thereof by a malfunction of head selection operation. This contributes to an improvement in the reliability of a protection of data stored in the magnetic disc storage.

Although the present invention has been disclosed and described by way of one embodiment, it is apparent to those skilled in the art that other embodiments and modifications of the present invention are possible without departing from the spirit or essential features thereof.

I claim:

1. An apparatus for driving a disc storage comprising:
   a writing means, responsive to a head select signal and a write gate signal fed from a host controller, for selecting one of a plurality of heads and writing write data via the selected head into a medium;
   a power supply voltage generating means, operatively connected to the writing means, for generating power supply voltages used in the apparatus;
   a power supply voltage monitoring means for monitoring a power supply voltage fed to the writing means from the power supply voltage generating means and, upon detecting an abnormality of the monitored power supply voltage, outputting a reset signal indicating the abnormality; and
   a latching means, operatively connected to the writing means and the power supply voltage monitoring means, for retaining the head select signal to be fed to the writing means from the host controller and, upon receiving the reset signal, prohibiting a latching and switching operation to be carried out by a subsequent head select signal fed from the host controller and maintaining an output state of the retained head select signal,
   the power supply voltage generating means being responsive to the reset signal and stopping a supply of the power supply voltage to the writing means.

2. An apparatus as set forth in claim 1, further comprising a power supply voltage clamping means, operatively connected to the power supply voltage generating means and the power supply voltage monitoring means and responsive to the reset signal, for causing the power supply voltage generating means to stop the supply of the power supply voltage to the writing means.

3. An apparatus as set forth in claim 2, wherein the head select signal is composed of a plurality of bit signals and the latching means comprises a plurality of latching circuits each provided for each of the plurality of bit signals.

4. An apparatus as set forth in claim 3, wherein each of the latching circuits comprises:
- a buffer for storing the head select signal fed from the host controller;
- a capacitor for switching the output state of the head select signal to be fed to the writing means, in accordance with a charging or discharging operation thereof;
- a charging means for charging the capacitor at a constant current;
- a discharging means for discharging the capacitor at a constant current;
- a switching means, operatively connected to the buffer, the charging means and the discharging means and responsive to the head select signal stored in the buffer, for selecting one of the charging means and the discharging means to thereby charge or discharge the capacitor accordingly; and
- a holding means, operatively connected between the switching means and the capacitor and responsive to the reset signal from the power supply voltage monitoring means, for disconnecting the capacitor from the switching means to maintain the capacitor in a charging or discharging state at the time of such a disconnection.

5. An apparatus as set forth in claim 4, wherein the holding means comprises a normally-closed type switching element which is turned OFF in response to a cut-off of the reset signal.

6. An apparatus as set forth in claim 1, wherein the power supply voltage generating means supplies the writing means with a first power supply voltage and supplies the latching means with a second power supply voltage lower than the first power supply voltage, the second power supply voltage being a voltage sufficient for the operation of the latching means.

7. An apparatus for driving a magnetic disc storage comprising:
- a head circuit unit, responsive to a magnetic head select signal and a write gate signal fed from a host controller, for selecting one of a plurality of magnetic heads and writing write data via the selected magnetic head into a medium;
- a power supply voltage generating circuit, operatively connected to the head circuit unit, for generating power supply voltages used in the apparatus;
- a power supply voltage monitoring circuit for monitoring a power supply voltage fed to the head circuit unit from the power supply voltage generating circuit and, upon detecting an abnormality of the monitored power supply voltage, outputting a reset signal indicating the abnormality; and
- a latching circuit unit, operatively connected to the head circuit unit and the power supply voltage monitoring circuit, for retaining the magnetic head select signal to be fed to the head circuit unit from the host controller and, upon receiving the reset signal, prohibiting a latching and switching operation to be carried out by a subsequent magnetic head select signal fed from the host controller and maintaining an output state of the retained magnetic head select signal,
- the power supply voltage generating circuit being responsive to the reset signal and stopping a supply of the power supply voltage to the head circuit unit.

8. An apparatus as set forth in claim 7, further comprising a power supply voltage clamping circuit, operatively connected to the power supply voltage generating circuit and the power supply voltage monitoring circuit and responsive to the reset signal, for causing the power supply voltage generating circuit to stop the supply of the power supply voltage to the head circuit unit.

* * * * *